(No Model.)  2 Sheets—Sheet 1.

J. ZIMMERMAN & W. D. ALFORD.
Meat Cutting Machine.

No. 236,524.  Patented Jan. 11, 1881.

Attest,
Wm. H. H. Knight
W. Blackstock

Inventor,
John Zimmerman,
Wm. D. Alford.
By C. J. Elesworth
Their Attorney.

(No Model.) 2 Sheets—Sheet 2.
J. ZIMMERMAN & W. D. ALFORD.
Meat Cutting Machine.
No. 236,524. Patented Jan. 11, 1881.
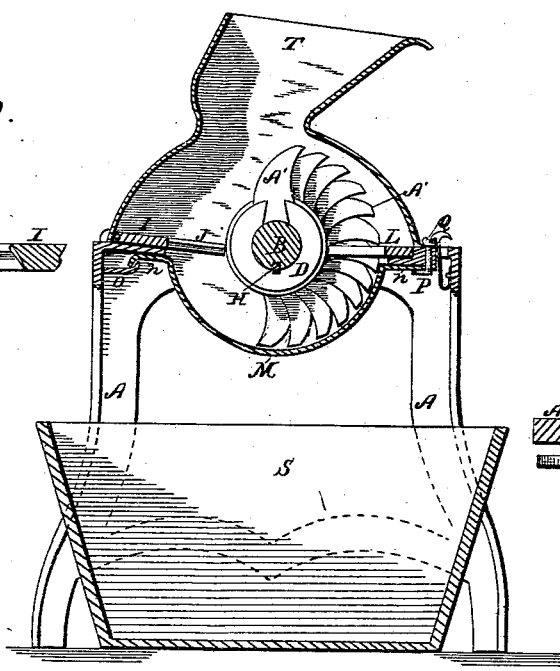
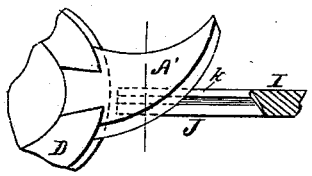
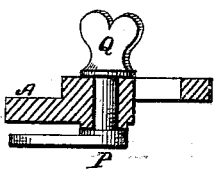
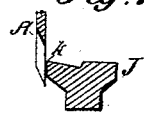
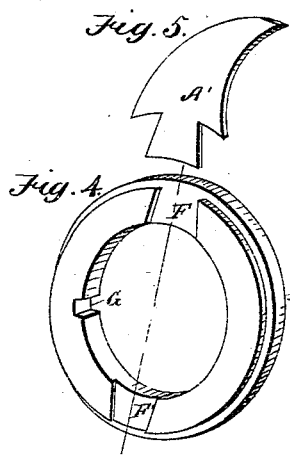
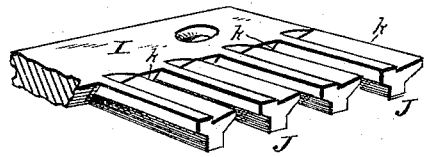
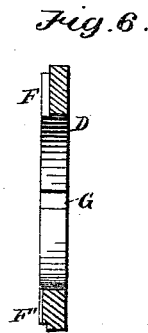
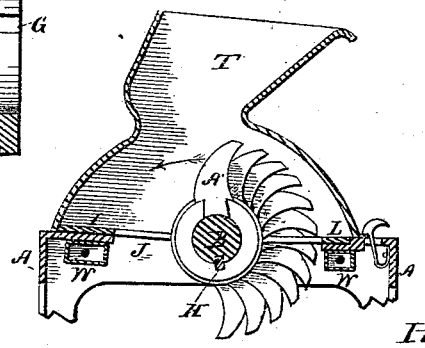
Attest,
Wm. H. H. Knight.
W. Blackstock.
Inventor,
John Zimmerman.
Wm. D. Alford.
By A. L. Ellsworth
Their Attorney.

UNITED STATES PATENT OFFICE.

JOHN ZIMMERMAN AND WILLIAM D. ALFORD, OF CINCINNATI, OHIO.

MEAT-CUTTING MACHINE.

SPECIFICATION forming part of Letters Patent No. 236,524, dated January 11, 1881.

Application filed November 19, 1880. (No model.)

*To all whom it may concern:*

Be it known that we, JOHN ZIMMERMAN and WILLIAM D. ALFORD, both of Cincinnati, in the county of Hamilton and State of Ohio, have invented certain new and useful Improvements in Meat-Cutting Machines; and we do hereby declare the following to be a full, clear, and exact description of the same, reference being had to the accompanying drawings, forming part of this specification, in which—

Figure 1:
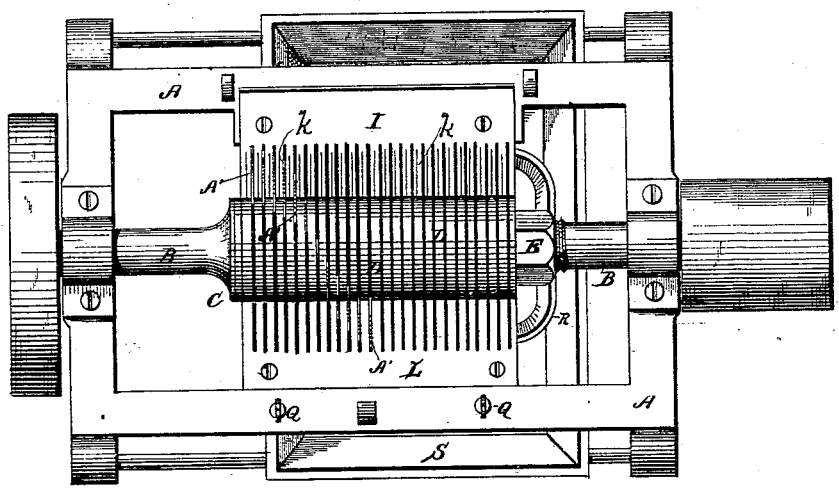
Figure 2:
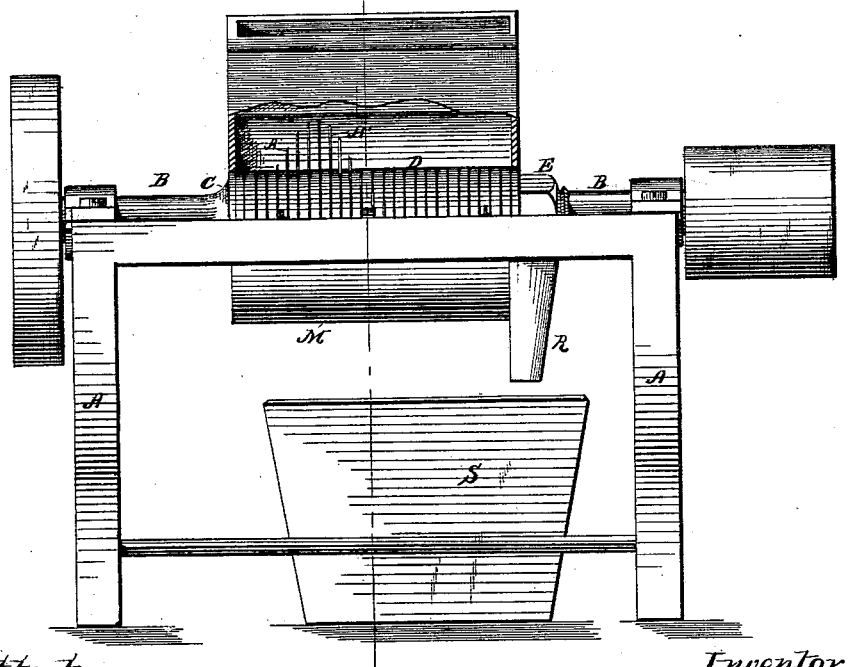

Figure 1 is a top-plan view of a meat-cutting machine constructed in accordance with our invention, the feed-hopper being removed. Fig. 2 is a front elevation of the same, partly in section. Fig. 3 is a transverse vertical section. Fig. 4 is a perspective view of a knife-holding collar. Fig. 5 is a perspective view of a knife detached from its collar. Fig. 6 is a transverse section of a knife-holding collar. Fig. 7 is a perspective view of a portion of a comb-plate. Fig. 8 is a detached view of one of the latches by which the concave meat-trough is held to the frame of the machine, a portion of the latter being shown in section. Fig. 9 is a side view of a knife and comb-tooth, showing their position and relative length. Fig. 10 is a transverse section of a knife and comb-tooth, showing their relation to each other in the operation of cutting meat. Fig. 11 is a transverse section of the frame, showing the position of the steam-heaters for the comb-plates.

Similar letters of reference in the several figures denote the same parts.

Our invention relates to that class of meat-cutting machines in which a series of knives is set in a rotary cylinder and arranged to move between the teeth of a metal comb-plate affixed to the side of the machine, the meat to be cut being fed down upon the comb-plate within the path of the knives, which cut it as they move down between the comb-teeth. Much difficulty has been found in the operation of these machines in respect to the attachment of the knives to the cylinder and in their action upon the meat, which it is the principal object of our invention to overcome.

As the knives have frequently to be removed for grinding and for replacement when broken, it is necessary that they shall be so attached to the cylinder as to be easily removed and replaced without disorganizing the cylinder, and in such a manner as to prevent their disarrangement thereon and avoid the liability of their being inaccurately fitted with respect to each other and the combs. Various means have been adopted for this purpose, one of which consists in providing the cylinder with two or more longitudinal grooves of dovetail form in cross-section, the shanks of the knives being also dovetailed to fit into the grooves, with dovetailed wooden or metal spacing-blocks between them. The knives are applied and removed lengthwise of the cylinder, and therefore, if any intermediate knife requires removal, all the knives and the blocks between it and the nearest end of the cylinder must be first slipped out before it can be moved through the groove. The knives cannot, therefore, be separately applied and removed excepting the two end ones, and as the spacing-blocks cannot well be made exactly alike, nor the knife-shanks of exactly the same thickness, the removal and replacement of a number of each is liable to change, to a certain extent, the position of the knife-edges with respect to the comb-teeth; hence the edges cannot safely be made to move in close contact with the vertical side of the teeth, but must be removed therefrom some distance in order to prevent the knives from striking the teeth. The knives have also been clamped between collars on the shaft of the cylinder by being let into the edges of the collars the full thickness of the latter, or into adjustable disks between such collars; but in the former case the collars are liable to spring and loosen the knives when the resistance to their cutting action is great—such, for example, as their contact with a bone or nail in the meat; and in the latter case the disks are liable to displacement between the collars, which are only used for spacing-pieces, and therefore the arrangement of the knives to produce the best effect is destroyed.

To overcome or avoid these defects, our invention consists in the employment of collars adapted to slide on and off the main shaft, and constructed with radial dovetailed recesses in one face to receive the dovetailed shanks of the knives, the recesses being of a depth equal to the thickness of such shanks, so that when all the collars are clamped on the shaft their non-recessed faces shall bear against the shanks and hold them firmly in place. The collars are also grooved internally to slide over a spline or feather on the shaft, the grooves in the whole number of collars being at different and regularly proportioned distances from the radial line of the knives, in order to give a spiral arrangement of the latter around the shaft. By this construction the collars can always be accurately fitted, the knives uniformly spaced, and each knife can be detached and applied without removing the others from their collars.

Another feature in the construction of the collars consists in forming two dovetailed recesses in the same face of the collar, but upon opposite sides of the shaft, one recess being shallow to receive a thin knife for light work, and the other made deep to receive a thick knife for heavy work. By this means only one set of collars is required for each machine. We do not, however, limit this part of our invention to a double-recessed collar, because many machines use but one set of knives, and hence the collars each require but one recess. Collars with one, two, or more of such recesses, therefore, we regard as included in our invention. We have found by experiment that in most kinds of meat, particularly pork, there are certain fine thread-like fibers which are so tough and pliable that the meat-cutting machines in general use will not sever them; but the knives draw them between the comb-teeth, and they are either mixed with the minced meat, thereby causing it to cling together in stringy masses, or else they collect in bunches in the receptacle below, and are thrown away as useless because they cannot be cut or minced in the machine.

The second part of our invention consists in the provision of means for cutting these fine fibers into short lengths, and thus utilize them with the other portions of the meat; and such means consist in constructing the comb-plate teeth with one raised and sharpened edge, and in beveling only one edge of the knives, in order that the other straight side shall move down and along the sharpened edge of the teeth with close contact and a shearing action. By this means the fibers are easily cut, and cannot be drawn down between the contact-surfaces of the knives and teeth. In order to insure the success of this operation it is necessary that the knives shall be accurately fitted to the main shaft, and, as already stated, it is equally necessary that such knives shall be removable for a different purpose; hence, in the construction of the knives and collars, and their arrangement for the purposes of this machine on the main shaft, these two essential features must be preserved without interfering with each other, and this is accomplished by our construction and application of the knives and collars; but so far as concerns merely the mode of securing the knives to the shaft, which is a distinct and separate part of our invention, the form of the knife-edges and comb-teeth is not material, nor is it material that there should be any comb-teeth, as the construction may be applied to advantage in meat-mixers and many other classes of machines for the purpose of securing blades to shafts.

A further feature of our invention consists in providing both sides of the frame with a comb-plate—one constructed for cutting purposes, as above described, and the other to act as clearers for the ascending knives, and to prevent the minced meat from being thrown upward out of the trough beneath the cylinder. We do not use two combs with all machines, one being sufficient in many cases, and therefore the invention is not confined to the use of two.

The invention further consists in the combination of a concave trough with the spirally-arranged knives and the cutting and clearing combs, for the purpose of receiving the minced meat, so that it can be mixed by the passage of the knives through it and be fed along the trough to one end thereof, from which it is discharged, thoroughly mixed, into a receptacle placed beneath the machine.

These machines, with the concave trough removed, are used for cutting leaf-lard and tallow in the manufacture of oleomargarine; but the fine particles of the cut material so clog the comb-plates and knives that frequent cleaning becomes necessary, for which purpose the machines must be stopped and the parts thoroughly scraped. To avoid this objection we combine a steam-heater with the plates to heat them, so that the gummy material will readily melt and slip off, thereby keeping them constantly clear and preventing all liability of clogging either the knives or combs. It will be understood, however, that the steam-heaters are not applied to all the meat-cutting machines, but only to such as are intended for cutting the oleomargarine materials.

In the accompanying drawings, A represents a rectangular metal frame, supported upon suitable legs and of sufficient size to receive the working parts.

B is the knife-shaft, extending longitudinally through the center of the frame, with bearings at each end thereof, and provided with a balance-wheel at one end and a band-pulley at the other end.

C is a wide bearing head or shoulder formed on the shaft near one end, and D D are the knife-collars, slipped upon the shaft and clamped together against the head by a nut, E, screwed upon the shaft from the end opposite the head. The collars are made of the same size and form, to slip easily on and off the shaft, and with a dovetailed radial recess, F, in one side to receive the dovetailed shank of a knife, A', as shown in Figs. 4, 5, and 6. The recess in each collar is made of a depth equal to the thickness of a knife-shank, and when the latter is inserted its outer face lies flush with the face of the collar. The collars are also made with grooves G in their interior walls, to fit upon a spline, H, secured to the shaft, as shown in Fig. 3, the grooves in the whole number of collars being made at different points, so that when slipped onto the shaft the knives shall extend spirally around it. The spline locks the collars firmly against turning on the shaft, and when the nut E is set up the non-recessed faces of the collars bear against the shanks of the knives in the collars next adjoining and lock them against lateral movement or displacement. Thus the knives are fastened rigidly in place, and as all are made alike, as well as the collars, they can be interchanged upon the shaft without varying their positions with relation to the comb-teeth.

If for any reason it becomes necessary to remove one or more of the knives, it is only necessary to loosen the nut E and separate the collars sufficiently to disengage the knife-shank from its recess, when it can be readily lifted out. It can, of course, be as easily replaced, and the whole number again locked together by screwing up the nut.

If desired, a second dovetailed recess, F', may be made in each collar diametrically opposite the recess F, but of less depth, for the purpose of receiving a thinner knife. Thus two sets of knives, one for light and the other for heavy work, can be applied to the same collars, thereby saving the expense of two sets of collars. More than two sets of recesses may be provided, if required, of the same or different depths, and one or more sets of knives used at the same time. We prefer, however, to employ but one set at a time, as we have found it amply sufficient for good practical work.

I is the metal comb-plate, the teeth J of which act, in connection with the knives, to cut the meat. It is screwed firmly to the frame of the machine, with its teeth projecting inward toward the knife-shaft, so that the knives shall pass down between them. Each tooth is milled or ground out upon its upper surface to form a longitudinal groove, and thereby raise one edge, $k$, to form a cutter. The knives are curved outward and backward from the cylinder to sweep along, substantially, the entire length of each tooth, as shown in Fig. 9, and in so doing not only cut the meat, but push back on the comb any hard substance contained in the meat which they cannot cut, thereby preventing them from being broken. The knives are also beveled on one side only—that is to say, on the side farthest from the tooth with which each knife acts—while the side next the tooth is flat, and passes down past and in contact with the said edge $k$ of the tooth, as shown in Fig. 10. This construction and arrangement of the knives and teeth adapt them to operate with a shearing cut, bearing closely against each other, and therefore enables them not only to sever the meat with certainty, but also to cut up the short thready fibers contained in the meat, as hereinbefore set forth.

L is the clearing-comb, secured to the opposite side of the frame, so that the knives shall pass upward between its teeth, which thus serve to clear them of the minced meat, and also act as guards to prevent the rotation of the knives from throwing the meat upward and out of the receiving-trough beneath the cylinder. The teeth of this comb are not formed with cutting-edges, as they only act as clearers and guards, and do not aid the cutting.

M is the concave trough, applied to the under side of the frame beneath the cylinder, and of such size that the points of the knives shall move in close proximity to its inner surface. It is supported in place by any convenient means. As shown in the drawings, its upper edges are formed with flanges $n\ n$, one to fit upon a shelf, $o$, at the back of the frame, and the other at the front of the frame, to afford a hold for the latches P, which are inserted in the frame and provided with thumb-nuts Q, by which they are turned under the flange to hold up the front edge of the trough or swing clear of the flange to release the trough. One end of the trough is closed, and the other end provided with a discharge-spout, R, through which the minced meat is fed into the box S or other receptacle placed under the machine. The trough serves to retain the minced meat for a certain length of time for the knives to thoroughly stir and mix it, and inasmuch as the knives are spirally arranged upon the shaft they not only mix the meat, but feed it gradually along the trough into the discharge-spout. They therefore act as conveyers as well as cutters and mixers.

T is the hopper, hinged to the frame of the machine, and shutting down over the knives and shaft. It is formed with inclined sides, in the usual manner, to facilitate the feed of the meat to the cutters.

When the machine is used for cutting leaf-lard and tallow, in the manufacture of oleomargarine, the conveyer-trough is not employed, but steam-heaters of any suitable kind, such as pipes or cases, are attached to the frame of the machine immediately under the combs, for the purpose of heating the latter as well as the knives, and thereby melt the fatty substances and prevent them from clogging the comb-teeth and knives. As shown in the drawings, the heaters are made in the form of boxes, W, with a steam-supply pipe at one end and an exhaust at the opposite end. The form of the heater, however, is not essential, and it may be heated by steam from a boiler or by hot water circulating through it. But while the general form is not essential, it is necessary that it should be so formed and applied as not to melt the oleomargarine material contained in the hopper; otherwise the fatty matter could not be cut by the knives.

The several features of our invention above set forth are not all embodied in the same machine, as we have already pointed out, some being used for one purpose and some for another, according to the character of the work to be performed.

Having thus described our invention, what we claim is—

1. The knife-collars constructed with one or more radial dovetailed recesses in one face, to receive the dovetailed shank of a knife, and of a depth equal to the thickness of said shank, substantially as described, for the purpose specified.

2. The knife-collars constructed with radial dovetailed recesses in one face, of different depths, to receive thick or thin knives, substantially as described, for the purpose specified.

3. The combination, upon a single shaft, of a series of collars having one or more radial dovetailed recesses in one face of each, with a series of knives constructed with dovetailed shanks to fit within said recesses, the whole being clamped upon the shaft between a fixed head and a nut, with the non-recessed faces of the collars bearing against the shanks of the knives in adjoining collars, substantially as described, for the purpose specified.

4. In a machine for cutting meat, the combination of a series of collars having radial dovetailed recesses in one face, with a series of radial knives having dovetailed shanks to fit within said recesses, the whole being clamped upon a shaft between a fixed head and a nut, with the collars so fitted upon a spline or key as to give the knives a spiral arrangement upon the shaft, substantially as described, for the purpose specified.

5. In combination with the series of rotary cutters, the cutting-comb I, composed of a metal plate formed with teeth on one edge, which are each shaped longitudinally to produce a raised cutting-edge, $k$, substantially as described, for the purpose specified.

6. The combination of the curved knives, formed with one flat side, with the comb-teeth J, formed with a raised cutting-edge, $k$, said knives and teeth operating with close contact to form a shearing cut, substantially as described, for the purpose specified.

7. The combination, with the rotary knives, of the cutting comb-plate I, having raised edges $k$, and placed on one side of the knife-shaft, and a suitable clearing-comb, L, placed on the opposite side of the shaft, substantially as described, for the purpose specified.

8. The combination of the separately-removable knives and sliding collars, provided with recesses in one side, with the cutting comb-teeth J $k$, substantially as described, for the purpose specified.

9. The combination of the trough M with the frame, the spirally-arranged knives, and the cutting and clearing combs, substantially as described, for the purpose specified.

10. The combination of the heaters, placed substantially as described, with one or both comb-plates, for the purpose of preventing oleomargarine material from adhering to them, and at the same time preventing the hopper from becoming so highly heated as to melt the material within it, substantially as described.

JOHN ZIMMERMAN.
WILLIAM D. ALFORD.

Witnesses:
JOHN ANTHONY,
P. J. JONES.